US 6,634,380 B2

(12) United States Patent
Bartkus et al.

(10) Patent No.: US 6,634,380 B2
(45) Date of Patent: Oct. 21, 2003

(54) CERAMIC DISC DIVERTER VALVE

(75) Inventors: Eric K. Bartkus, Ada, MI (US);
Bradley J. Pippel, Grandville, MI (US)

(73) Assignee: Access Business Group International LLC, Ada, MI (US)

( * ) Notice: Subject to any disclaimer, the term of this patent is extended or adjusted under 35 U.S.C. 154(b) by 113 days.

(21) Appl. No.: 10/039,443

(22) Filed: Oct. 29, 2001

(65) Prior Publication Data

US 2002/0148516 A1 Oct. 17, 2002

Related U.S. Application Data

(60) Provisional application No. 60/259,948, filed on Jan. 5, 2001, and provisional application No. 60/244,245, filed on Oct. 30, 2000.

(51) Int. Cl.$^7$ ............................................. F16K 11/074
(52) U.S. Cl. .................................. 137/625.46; 137/801
(58) Field of Search ........................... 137/625.46, 801

(56) References Cited

U.S. PATENT DOCUMENTS

| | | | |
|---|---|---|---|
| 4,653,538 A | * 3/1987 | Tsutsui et al. ......... | 137/625.46 |
| 4,794,952 A | * 1/1989 | Burkard .................. | 137/625.46 |
| 5,279,329 A | 1/1994 | Pippel | |
| 5,701,934 A | 12/1997 | Kuran et al. | |
| 5,931,196 A | * 8/1999 | Bernardi et al. ........ | 137/625.46 |
| 5,983,938 A | * 11/1999 | Bowers et al. ......... | 137/625.17 |
| 6,517,720 B1 | * 2/2003 | Aldred et al. ............... | 137/801 |
| 6,550,496 B2 | * 4/2003 | Tiemann et al. ........ | 137/625.46 |

* cited by examiner

Primary Examiner—John Fox
(74) Attorney, Agent, or Firm—Warner Norcross & Judd LLP

(57) ABSTRACT

A ceramic disc diverter valve for use with a water treatment device. The diverter includes a movable disc sandwiched between two stationary discs. The movable disc is rotated between three different positions to deliver a stream of untreated water, a spray of untreated water or a flow of treated water. When delivering treated water, the diverter directs the flow of water out of a secondary outlet to a water treatment device. The treated water is returned to the diverter through a secondary inlet and is discharged from the diverter through a treated water outlet. When delivering untreated water, both the secondary inlet and the secondary outlet are sealed by the ceramic discs. The movable disc preferably includes an integral handle that protrudes from the housing.

27 Claims, 15 Drawing Sheets

CERAMIC DISC DIVERTER VALVE

PRIORITY CLAIM

This application claims priority from U.S. Provisional Application No. 60/244,245, filed Oct. 30, 2000, entitled "Ceramic Disc Diverter Valve" and U.S. Provisional Application No. 60/259,948, filed Jan. 5, 2001, entitled "Ceramic Disc Diverter Valve".

BACKGROUND OF THE INVENTION

I. Field of the Invention

The present invention relates to diverter valves and more particularly to a ceramic disc diverter valve for attachment to a water faucet to selectively control the flow of water through a water treatment system.

II. Description of the Related Art

The quality of water delivered through a faucet is a matter of concern to a great many people. For many people, the water furnished by municipal or building water supplies is sufficiently pure for washing or rinsing purposes, but not of sufficient quality for drinking or cooking. Accordingly, water treatment devices are available which connect to a faucet and treat the water flowing out of the faucet. Such devices may either attach directly to the outlet of the faucet, or may include a diverter that directs the flow of water from the faucet through the treatment device and back to the faucet. Because filter and purifying media are frequently consumable, conventional diverters have the ability to bypass the water treatment device when treated water is not necessary, such as when washing or rinsing. This extends the life of the filter and purifying media.

Traditionally, diverter valves intended for use with water treatment devices only shut off the inlet line of the water treatment device or the outlet line from the water treatment device. Shutting off the water only at the inlet line is problematic because water can continue to drain out of the treated water outlet creating an open passage for bacteria and other undesirables to enter the treated water return line and possibly the water treatment device itself. Further, the continued flow of water from the treated water output after the diverter has been switched to an untreated mode is itself undesirable. Shutting off the water at only the treated water return line is problematic because the water treatment system remains under supply line pressure at all times. Surges in the supply line pressure may damage the water treatment device. U.S. Pat. No. 5,279,329 to Pippel discloses a diverter valve intended to address these concerns. The Pippel diverter operates in treated mode, untreated stream mode and untreated spray mode. The diverter includes a spool valve that, when in the untreated stream mode or untreated spray mode, closes the treated water return line and separates the supply line from the water treatment system. Although a marked improvement, the spool valve is relatively large and includes conventional O-rings that have a relatively short life.

SUMMARY OF THE INVENTION

The noted problems are overcome by the present invention wherein a diverter for use with a water treatment device is provided with a ceramic disc valve having positive shut-off of both the inlet and outlet lines of the water treatment device when in an untreated water mode. In a preferred embodiment, the diverter valve includes three ceramic discs sandwiched together within a valve body, with the center disc being rotatable with respect to the others to selectively move the diverter between its various modes of operation.

In a preferred embodiment, the diverter is operable between a treated mode in which the diverter delivers treated water, an untreated spray mode in which untreated water is delivered in a spray and an untreated stream mode in which untreated water is delivered in a stream.

In a more preferred embodiment, the lower ceramic disc defines five holes and is stationary with respect to the body. The top ceramic disc defines one centrally disposed hole and is stationary with respect to the body. The center ceramic disc is sandwiched between the top and bottom discs and defines a single hole and a channel groove. The center disc is selectively movable to align the various disc holes as required to deliver the desired type of flow.

In a further preferred embodiment, the center disc includes an integral handle that protrudes from the valve body. The diverter is moved between its various modes of operation by rotating the handle with respect to the valve body.

In another preferred embodiment, the diverter includes a clamping mechanism for clamping the bottom disc to the valve body independently from the center and bottom discs. The clamping mechanism preferably includes a screw extending through the center of the bottom disc into the valve body. The screw clamps the bottom disc against a gasket.

The present invention provides a simple and effective ceramic disc diverter that is unique, among other things, in that it not only accomplishes the above operations with only three ceramic discs, but in all positions, except when treated water is flowing, the water treatment device is sealed off by the ceramic discs at both the untreated water outlet and the treated water inlet. Positively shutting off the water treatment device at both the inlet and the outlet, referred to herein as "double positive shutoff," reduces the likelihood of air and bacteria from entering the treatment device. Double positive shutoff also allows the water coming from the treatment device to be shut off immediately. This prevents the common problem of water run-on after the valve is moved out of the treated water position, which occurs in many conventional diverters as the water spills out of the line to or from the treatment device. The double positive shut off on the diverter valve also insulates the water treatment device from pressure surges in the water supply line, thereby protecting the water treatment device. The integral handle of the center disc permits rotation of the center disc independently of the valve housing. This eliminates the need to having an articulating housing and therefore eliminates the need for housing seals and the possibility of the housing leaking as the housing seal becomes worn. Further, the present invention provides "instant" startup when the diverter is returned to the treated mode due to latent compression in the water treatment device.

These and other objects, advantages, and features of the present invention will be more fully understood and appreciated by reference to the written specification and appended drawings.

DETAILED DESCRIPTION OF THE PREFERRED EMBODIMENT

Figure 1:
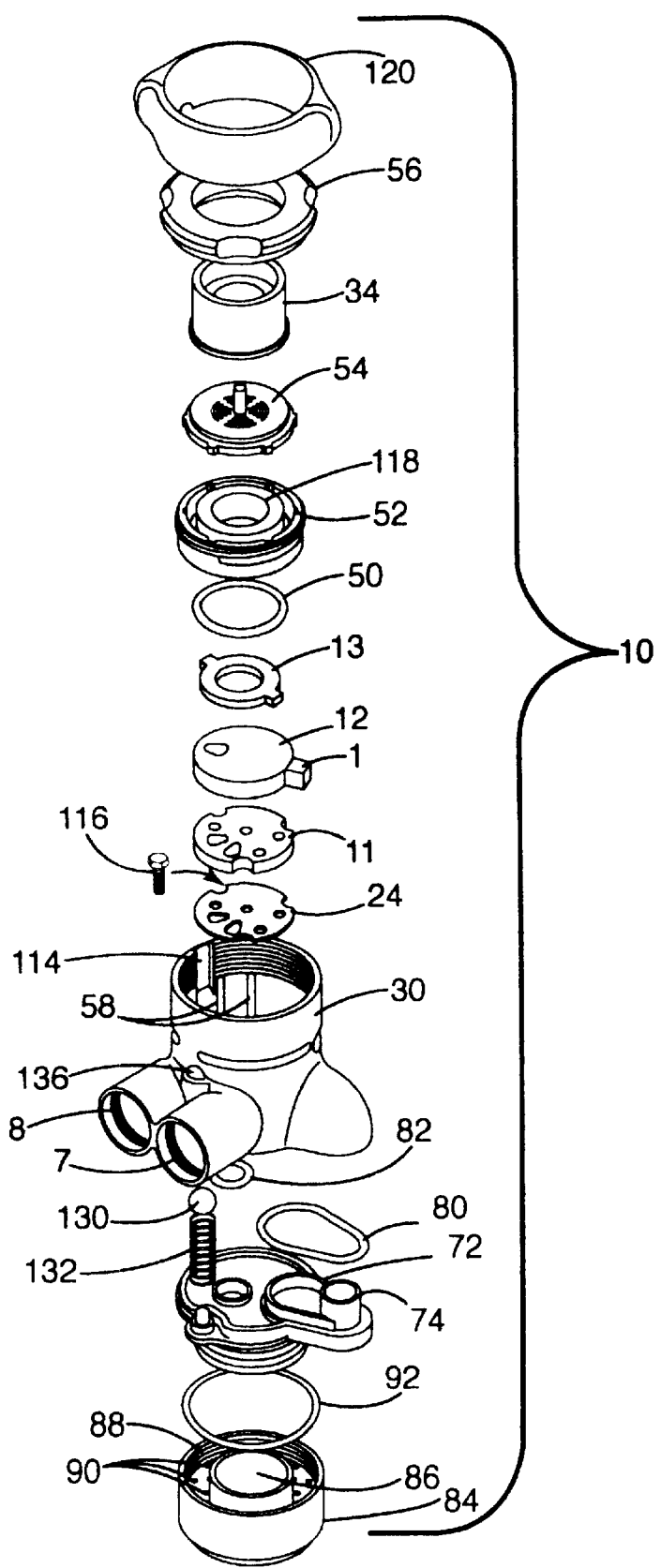
FIG. 1 is a front, exploded, perspective view of the ceramic disc diverter valve.

A ceramic disc diverter valve according to a preferred embodiment of the present invention is shown in FIG. 1, and is generally designated 10. The ceramic disc diverter valve 10 mounts to a conventional faucet and is connected with a water treatment device (not shown). The diverter 10 selectively operates in three different modes: (1) treated mode in which the diverter delivers a flow of treated water from a treated water outlet 14, (2) untreated stream mode in which untreated water is delivered in a stream from an untreated water stream outlet 6, and (3) untreated spray mode in which untreated water is delivered in a spray from an untreated water spray outlet 5. To connect with the water treatment device, the diverter 10 includes a secondary outlet 8 to supply untreated water to the water treatment device and a secondary inlet 7 to receive treated water from the water treatment device. The diverter 10 includes in its general organization a valve body 30 and a movable center disc 12 sandwiched between top and bottom stationary discs 13 and 11, respectively. The center disc 12 includes a handle 1 that protrudes from the valve body and is rotatable to move the diverter 10 into the desired mode of operation.

Figure 2:
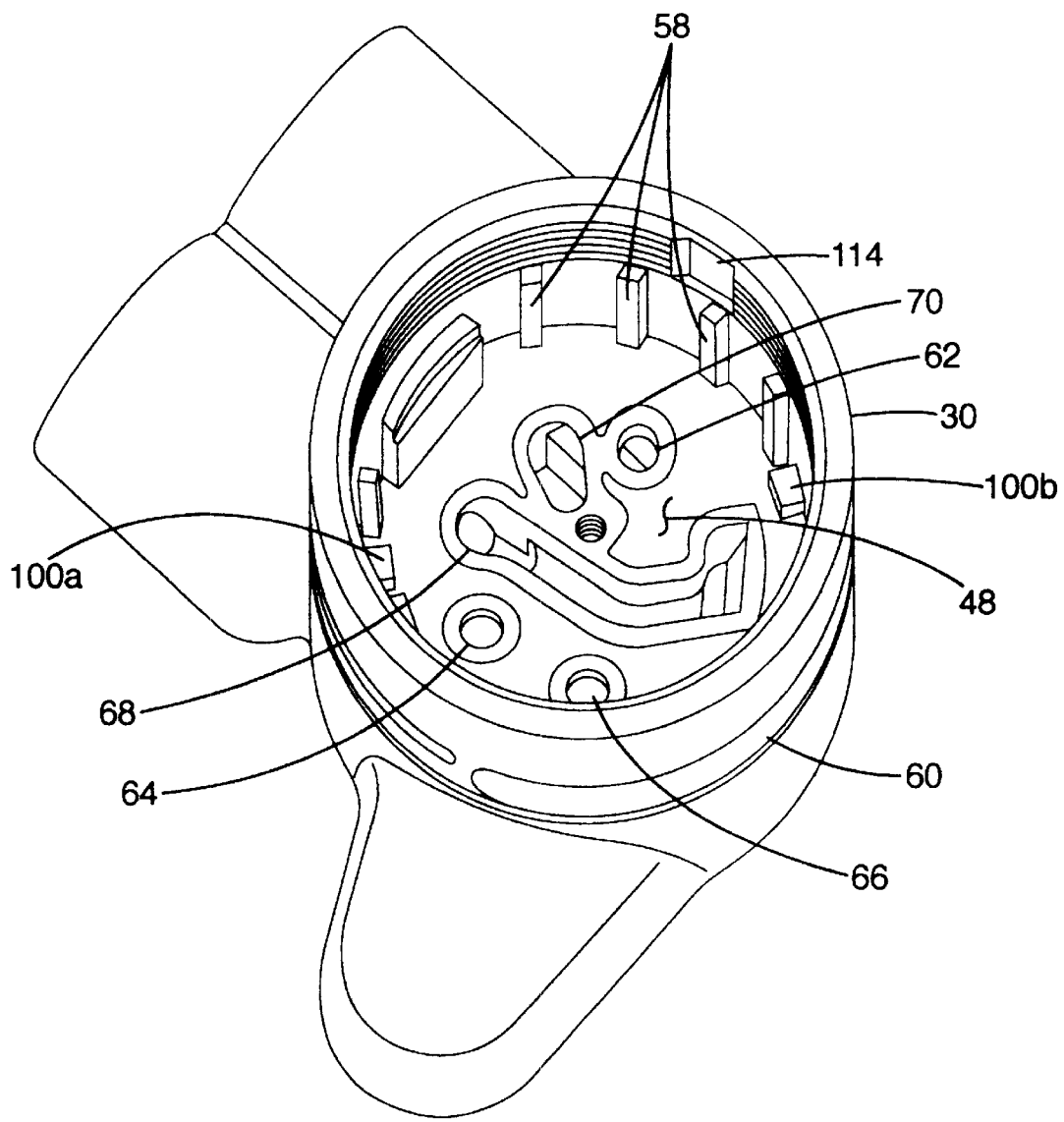
FIG. 2 is a top perspective view of the diverter valve body.
Figure 3A:
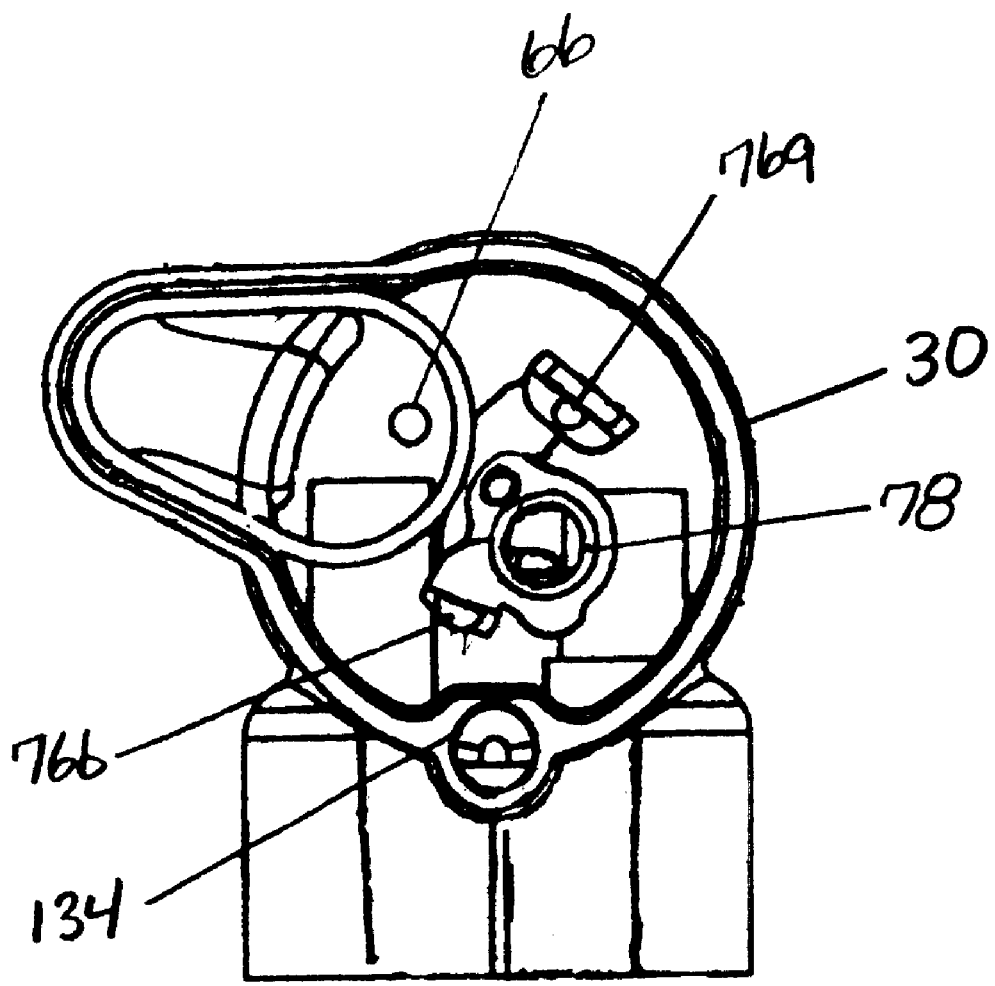
FIG. 3A is a bottom view of the diverter valve body.
Figure 3B:
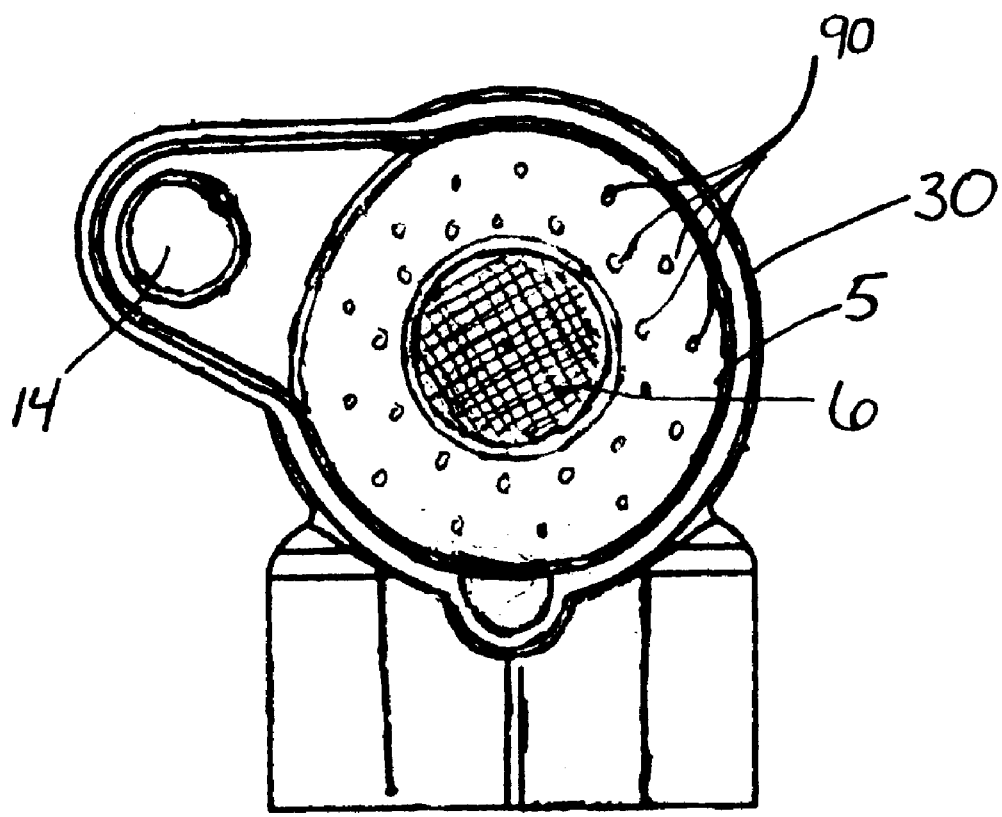
FIG. 3B is a bottom view of the diverter valve body with the spray head attached.
Figure 4:
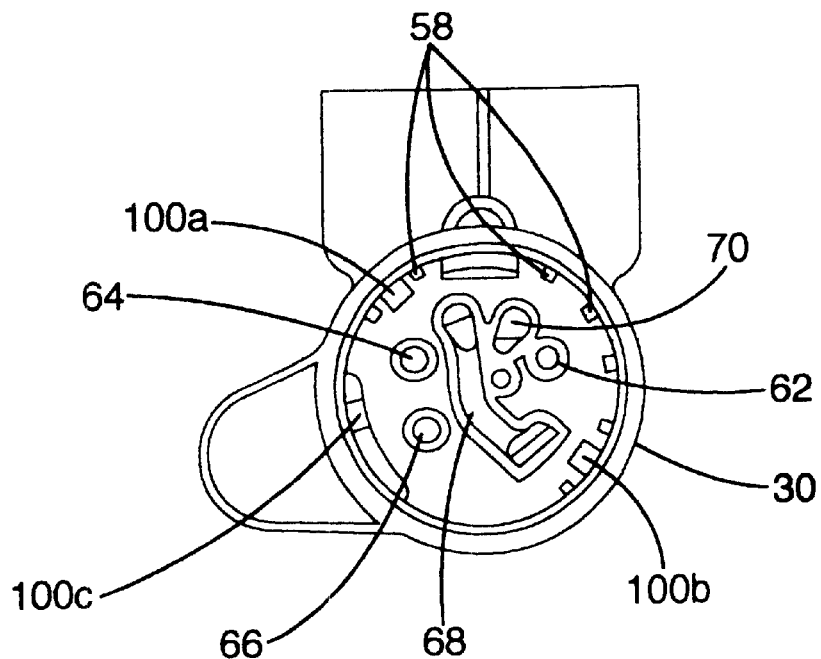
FIG. 4 is a top view of the diverter valve body.

The diverter valve body 30 will now be described in greater detail in connection with FIGS. 2–4. The body 30 is a generally upright cylindrical body having outwardly protruding secondary inlet 7, secondary outlet 8 and treated water outlet 14. Conventional fittings (not shown) are installed within the secondary inlet 7 and the secondary outlet 8 to permit connection to a water treatment device (not shown) using conventional water supply lines (not shown). If desired, a flow controller (e.g. a fixed orifice or flexible variable orifice flow controller) (not shown) can be installed in either the secondary inlet 7 or secondary outlet 8. An upwardly opening cylindrical cavity 48 is defined within the body 30. The cavity 48 is of sufficient size to receive the discs 11, 12 and 13 as well as an O-ring 50, a head nut 52, a gasket 54 and a compression nut 56. The upper end of the cavity 48 is internally threaded to threadedly receive the head nut 52 and compression nut 56. The body 30 includes ribs 58 or other protrusions to prevent overtightening of the head nut 52. The body 30 also defines a handle slot 60. The body 30 further defines a screw boss 96 located in the center of the base of cavity 48 for clamping the bottom disc 11 to the body 30, as described in more detail below. The body 30 also includes a closure 72 that closes the bottom of the body 30. The closure 72 is plastic welded or otherwise secured to the bottom of the body 30. The closure 72 includes a treated water spout 74, a spray hole 76 and a stream hole 78. An O-ring 80 or other seal is disposed about water spout 74. A second O-ring 82, or other seal, is disposed about stream hole 78. A detent spring 132 and detent ball 130 are fitted within a detent void 134 in the body 30 and secured by the closure 72. A portion of the detent ball 130 protrudes from a small detent opening 136 in the body 30 where it interacts with three detents (not shown) in a selector ring 120 to provide a tactile response as the diverter 10 moves between modes of operation. A spray head 84 is threadedly mounted to the closure 72. The spray head 84 includes an inner stream section 86 adapted to receive a conventional aerator (not shown) and to define untreated stream outlet 6. The spray head 84 also includes an outer spray section 88 with a plurality of holes 90 that defines untreated spray outlet 5. An O-ring 92 or other seal is disposed between the closure 72 and the spray head 84. The interior of the body 30 defines a plurality of passages that direct the flow of water through the diverter valve 10. A supply passage 62 extends from the base of the cavity 48 to the secondary outlet 8. A return passage 64 extends from the secondary inlet 7 to the base of the cavity 48. A treated outlet passage 66 extends from the base of the cavity 48 through the water spout 74 to the treated water outlet 14. A stream outlet passage 70 extends from the base of the cavity 48 through the stream hole 78 to the untreated stream outlet 6. And finally, a spray outlet passage 68 extends from the base of the cavity 48 through the spray hole 76 to the untreated spray outlet 5. The body 30, closure 72 and spray head 84 are preferably manufactured from high strength polymeric materials using conventional techniques and apparatus.

Figure 5:
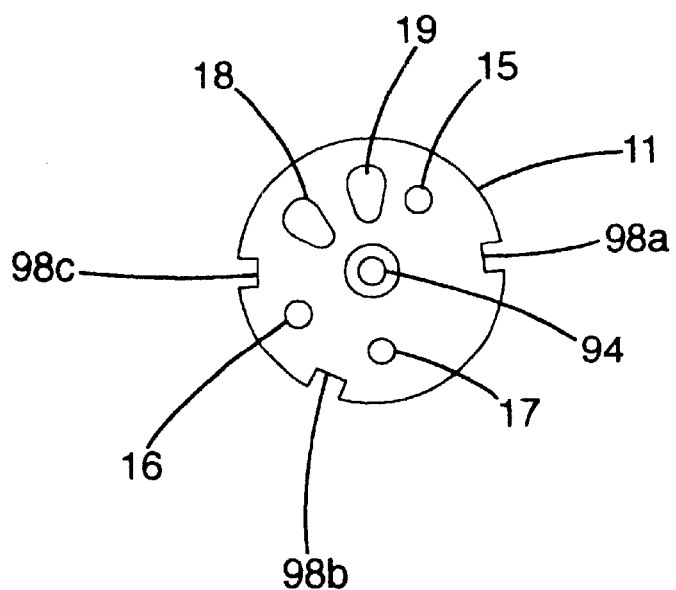
FIG. 5 is a top view of the stationary bottom ceramic disc.
Figure 6:
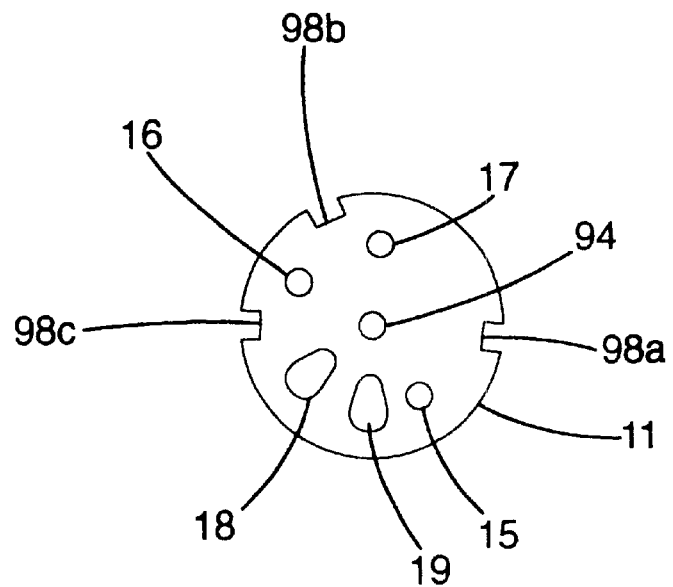
FIG. 6 is a bottom view of the stationary bottom ceramic disc.

As noted above, the diverter valve body 30 houses movable center ceramic disc 12, stationary top ceramic disc 13 and stationary bottom ceramic disc 11. The ceramic discs 11, 12 and 13 are manufactured using conventional techniques and apparatus. The ceramic discs 11, 12 and 13 are preferably highly polished to provide a water tight interface between ceramic surfaces that are in contact with one another. As shown in FIGS. 5–6, the bottom disc 11 defines five holes 15, 16, 17, 18 and 19 that communicate with the flow passages in the body 30. The supply hole 15 is aligned with the supply passage 62 to allow passage of untreated water to the secondary outlet 8. The return hole 16 is aligned with the return passage 64 to receive treated water returning through the secondary inlet 7. The treated outlet hole 17 is aligned with the treated outlet passage 66 to provide treated water to the treated water outlet 14 when the diverter is in the treated mode. The stream hole 19 is aligned with the stream outlet passage 70 to supply untreated water to the untreated stream outlet 6 when the diverter valve is in the stream mode. And finally, the spray hole 18 is aligned with the spray outlet passage 68 to supply untreated water to the untreated spray outlet 5 when the diverter is in the spray mode. The bottom disc 11 also defines a central screw hole 94 for clamping the bottom disc 11 to the base of the cavity 48 by a screw 116. The screw hole 94 may be counterbore if desired. The bottom disc 11 defines three keyways 98a–c that interfit with keys 100a-c formed in the body 30 to prevent rotation of the bottom disc 11. The bottom disc 11 is disposed over a gasket 24 that seals the undersurface of the bottom disc 11 against the diverter valve body 30. The gasket 24 defines openings aligned with the various holes 15, 16, 17, 18, 19 and 94 as well as notches aligned with the keyways 98a–c. During assembly, the gasket 24 and the bottom disc 11 are fitted within the cavity 48. The screw 116 is installed through the bottom disc 11 and the gasket 24 into the screw boss 96. The screw 116 is tightened to clamp the bottom disc 11 and gasket 24 in place. The screw 116 may be replaced by a variety of other clamping mechanisms. For example, the bottom disc 11 and gasket 24 may be sonically staked to the base of cavity 48. As another example, a separate headnut may be included to clamp down the bottom disc 11 and the gasket 24. In some applications it may be possible to eliminate the screw 116 and secure all three discs in the cavity 48 by the head nut 52. In some applications, however, the force required to adequately compress the gasket 24 with the head nut 52 would be so great that it would be difficult to rotate the center disc 12.

Figure 7:
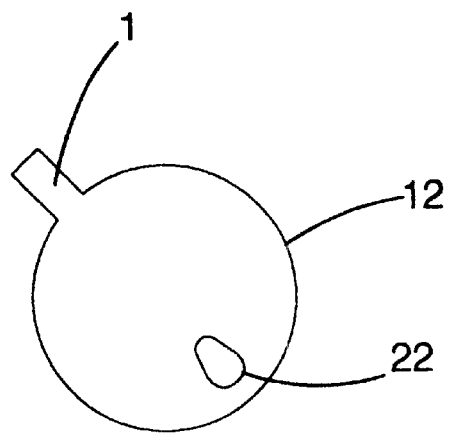
FIG. 7 is a top view of the movable center disc.
Figure 8:
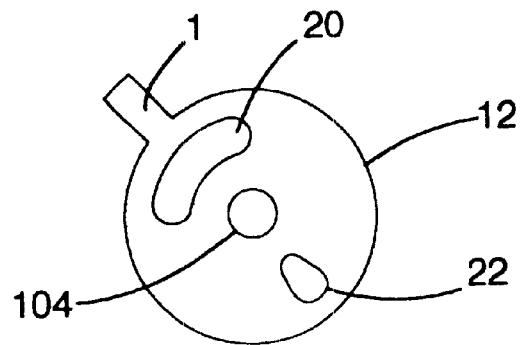
FIG. 8 is a bottom view of the movable center disc.

The movable center ceramic disc 12 is disposed above the stationary ceramic disc 11 and includes integral handle 1, which protrudes from the body 30 through handle slot 60. The center disc 12 is selectively movable with respect to the bottom disc 11 by operation of the integral handle 1. As shown in FIGS. 7–8, the center disc 12 defines a supply hole 22 that extends entirely through the disc 12 as well as a channel groove 20 disposed in the underside of the disc 12. The supply hole 22 is configured to align with the supply hole 15 in the bottom disc 11 when the diverter is in the treated mode, with the stream hole 19 in the bottom disc 11 when the diverter is in the untreated stream mode or with the spray hole 18 in the bottom disc 11 when the diverter is in the untreated spray mode. Additionally, the channel groove 20 is configured to align with and interconnect the return hole 16 and the treated outlet hole 17 when the diverter is in the treated mode. The center disc 12 may also define a central bore 104 in its bottom surface to accommodate the bottom disc clamping screw 116. The size, shape and precise layout of the holes and the channel groove in the bottom and center discs can vary from application to application and still provide the desired double positive shutoff.

Figure 9:
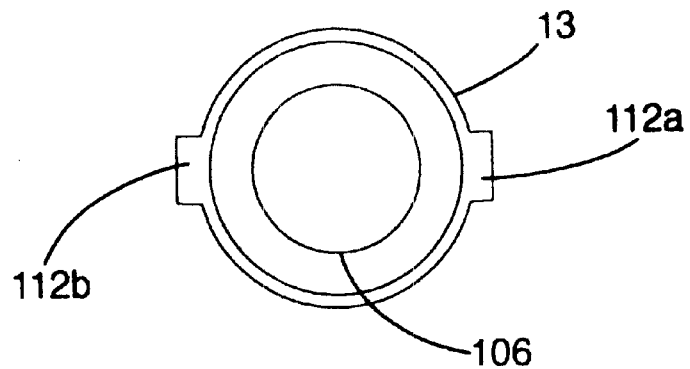
FIG. 9 is a top view of the stationary top disc.
Figure 10:
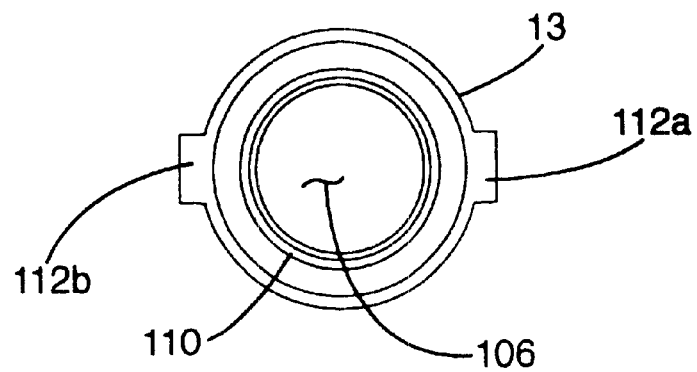
FIG. 10 is a bottom view of the stationary top disc.

The stationary top ceramic disc 13 is disposed above the center disc 12. As shown in FIGS. 9–10, the top disc 13 is generally annular, defining a large central through hole 106. The top disc 13 is tapered in cross-section, providing a relatively broad upper surface adapted to engage the O-ring 50 and a relatively narrow bottom surface. A narrow, integral annular band 110 extends around the undersurface of the top disc 13. The annular band 110 seals the interface between the top disc 13 and the center disc 12. Because of the band's narrow size, the surface area of interface between the top disc 13 and center disc 12 is reduced, thereby reducing the friction between the two components and facilitating rotation of the center disc 12. The top disc 13 includes a pair of ears 112a–b that interfit with a pair of corresponding keyways 114 (only one of which is visible in the illustrations) in the body 30 to prevent rotation of the top disc 13 with respect to the body 30.

Figure 11:
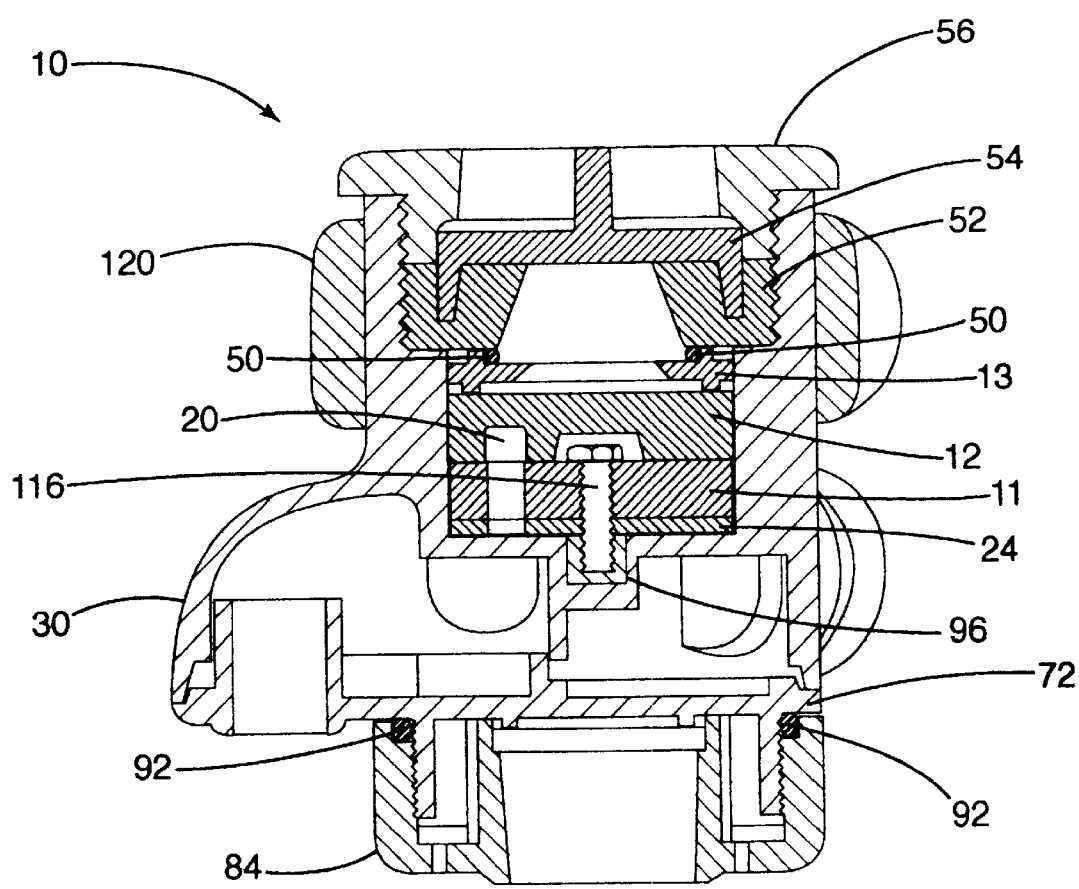
FIG. 11 is a sectional view of the left side of the ceramic disc diverter valve.
Figure 12:
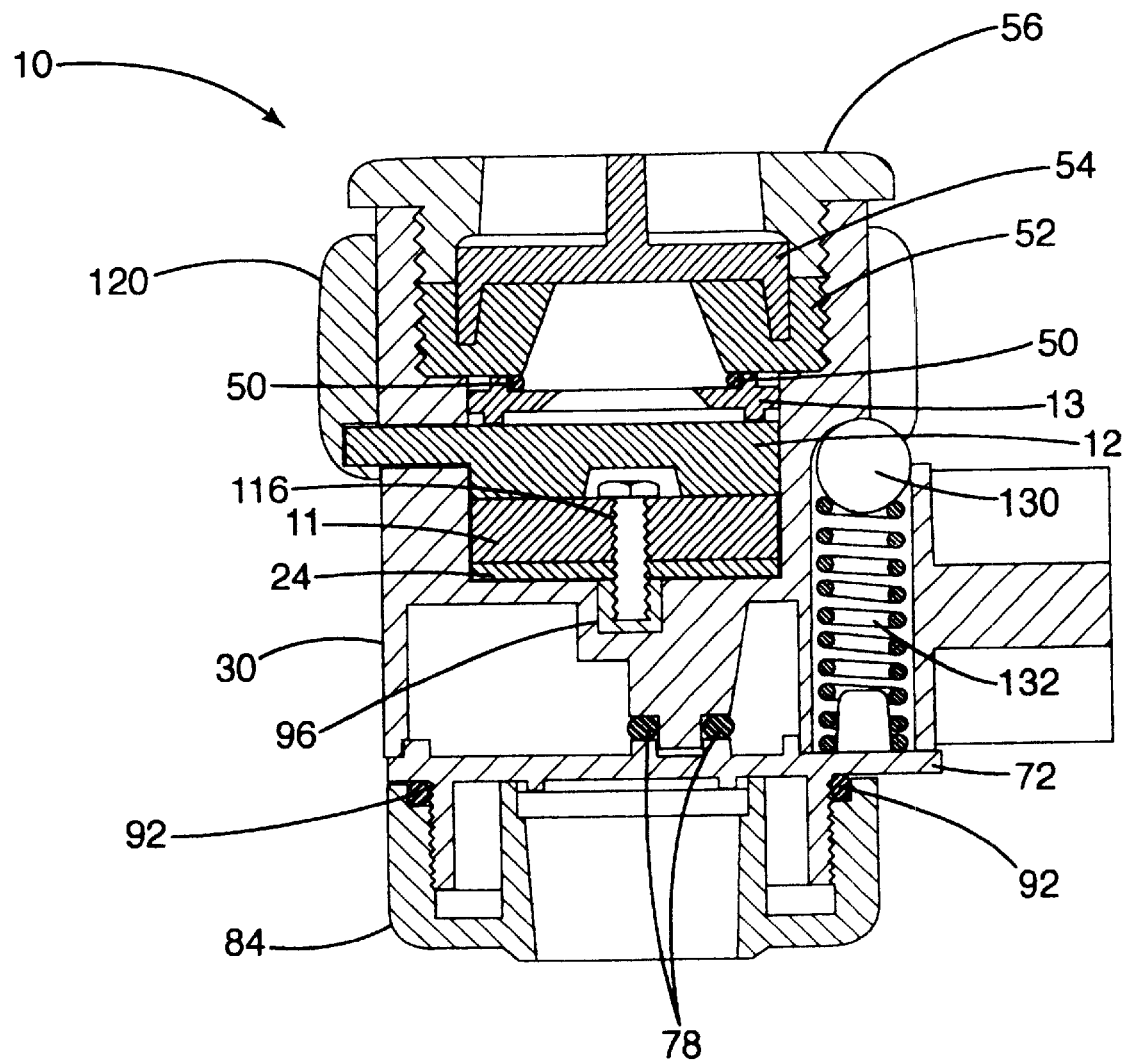
FIG. 12 is a sectional view of the right side of the ceramic disc diverter valve.

As shown in FIGS. 11–12, the center disc 12 and top disc 13 are firmly retained in the cavity 48 by the head nut 52. The head nut 52 is an annular, externally threaded component having a large central bore 118 that permits water to flow to the discs 11, 12 and 13. The O-ring 50, or other seal, is disposed between the head nut 52 and the top disc 13 to seal the interface between the head nut 52 and the top disc 13. The head nut 52 is configured to engage the ribs 58 when it is tightened to the point where the top disc 13 and center disc 12 are under the desired compression. This prevents overtightening of the head nut 52, which might otherwise make it overly difficult to rotate the center disc 12.

As noted above, the diverter 10 is secured to the faucet (not shown) using a conventional compression nut assembly. The compression nut 56 is adapted to fit around a conventional faucet adapter 34 and to threadedly fit into the upper end of the body 30. The gasket 54 is disposed between the compression nut 56 and the head nut 52 to seal the interface between the head nut 52 and the compression nut 56 and/or the faucet adapter 34.

The selector ring 120 is fitted over the body 30 in engagement with the handle 1 of the center disc 12. The selector rings 120 primary function is to provide an aesthetically desirable and easily operated actuator for the diverter 10. The ring 120 defines a slot (not shown) that is frictionally interfitted with the portion of handle 1 that protrudes from the body 30 through handle slot 60. The selector ring 120 also defines three detents (not shown). The detents interact with the detent ball 130 to provide a tactile response as the selector ring 120 moves the diverter 10 between its three modes of operation. More specifically, the detents are positioned on the selector ring 120 so that a detent aligns with the detent ball 130 as the center disc 12 is positioned in any of the three positions required to place the diverter 10 in one of its modes of operation. Although the selector ring 120 is preferably fully annular, it may assume a variety of alternative shapes and designs. For example, the selector ring 120 may be replaced by a semi-circular ring or other similar actuator. Although not strictly necessary, the selector ring or alternative actuator preferably fully covers the handle slot 60 throughout its entire range of motion. This will hide the handle slot 60 from view and reduce the likelihood of build-up of dirt, mold or mildew in the handle slot 60.

Operation

As described more fully below, the ceramic disc diverter valve can be set in one of three positions. In the treated mode, water is directed from the diverter 10 through the water treatment device (not shown) and out of the treated water outlet 14. In the untreated stream mode, water is directed through the diverter 10 to the stream outlet 6. In the untreated spray mode, water is directed through the diverter 10 to the spray outlet 5. More specifically, the diverter 10 is placed in the desired mode of operation by rotation of the selector ring 120. The selector ring 120 is connected to the handle 1 so that rotation of the selector ring 120 results in rotation of the center disc 12. In all modes of operation, water enters the diverter 10 through the faucet adapter 34 and flows through the gasket 54, the central bore 118 of the head nut 52, and the central hole 106 of the top disc 13 to the top surface of the center disc 12. The water enters the center disc supply hole 22 and, depending on the position of the center disc 12, directs water to one of the bottom disc supply hole 15, bottom disc stream hole 19 or bottom disc spray hole 18.

Figure 13:
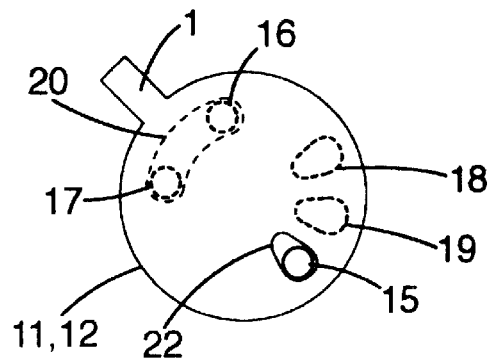
FIG. 13 is a top view of the stationary bottom and movable center discs in treated water mode.

The water flow paths of the diverter 10 in its various modes of operation will now be described with reference to FIGS. 13–15. As shown in FIG. 13, when the diverter 10 is in the treated mode the supply hole 22 of the center disc 12 is aligned with the supply hole 15 of the bottom disc 11. As a result, water flows from the center disc supply hole 22 to the bottom disc supply hole 15. From the bottom disc supply hole 15 water flows through the supply passage 62 to the secondary outlet 8. From the secondary outlet 8 the water flows through a water treatment device and once treated returns to the diverter 10 at the secondary inlet 7. From the secondary inlet 7, the treated water flows through the return passage 64 to the return hole 16 in the bottom disc 11. The treated water then flows through the return hole 16 into the channel groove 20 in the center disc 12. The treated water travels along the channel groove 20 and through the treated outlet hole 17 in the bottom disc 11. The treated water then flows through the treated outlet passage 66 to the treated water spout 74 and finally out the treated water outlet 14.

Figure 14:
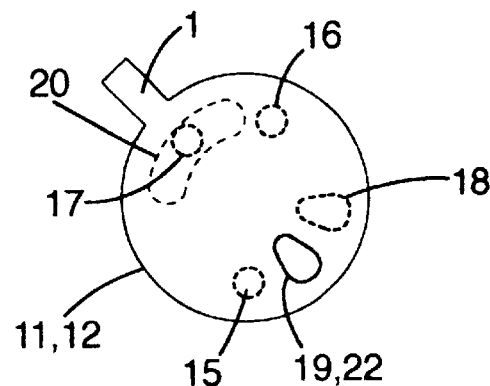
FIG. 14 is a top view of the stationary bottom and movable center discs in stream mode.

As shown in FIG. 14, when the diverter 10 is in the untreated stream mode the center disc supply hole 22 is aligned with the bottom disc stream hole 19. As a result, untreated water flows from the center disc supply hole 22 to the bottom disc stream hole 19. Water then flows through the stream outlet passage 70 to the stream section 86 of the spray head 84 and finally out the aerator (not shown) and stream outlet 6.

Figure 15:
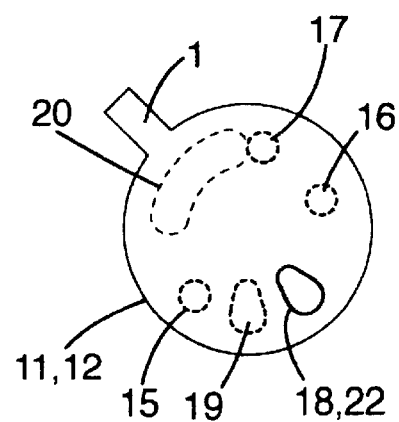
FIG. 15 is a top view of the stationary bottom and movable center discs in spray mode.

As shown in FIG. 15, when the diverter 10 is in the untreated spray mode the center disc supply hole 22 is aligned with the bottom disc spray hole 18. As a result, untreated water flows from the center disc supply hole 22 to the bottom disc spray hole 18. Water then flows through the spray outlet passage 68, including the closure spray hole 76, to the spray section 88 of the spray head 84 and finally out the spray outlet 5.

Alternative Embodiment

Figure 16:
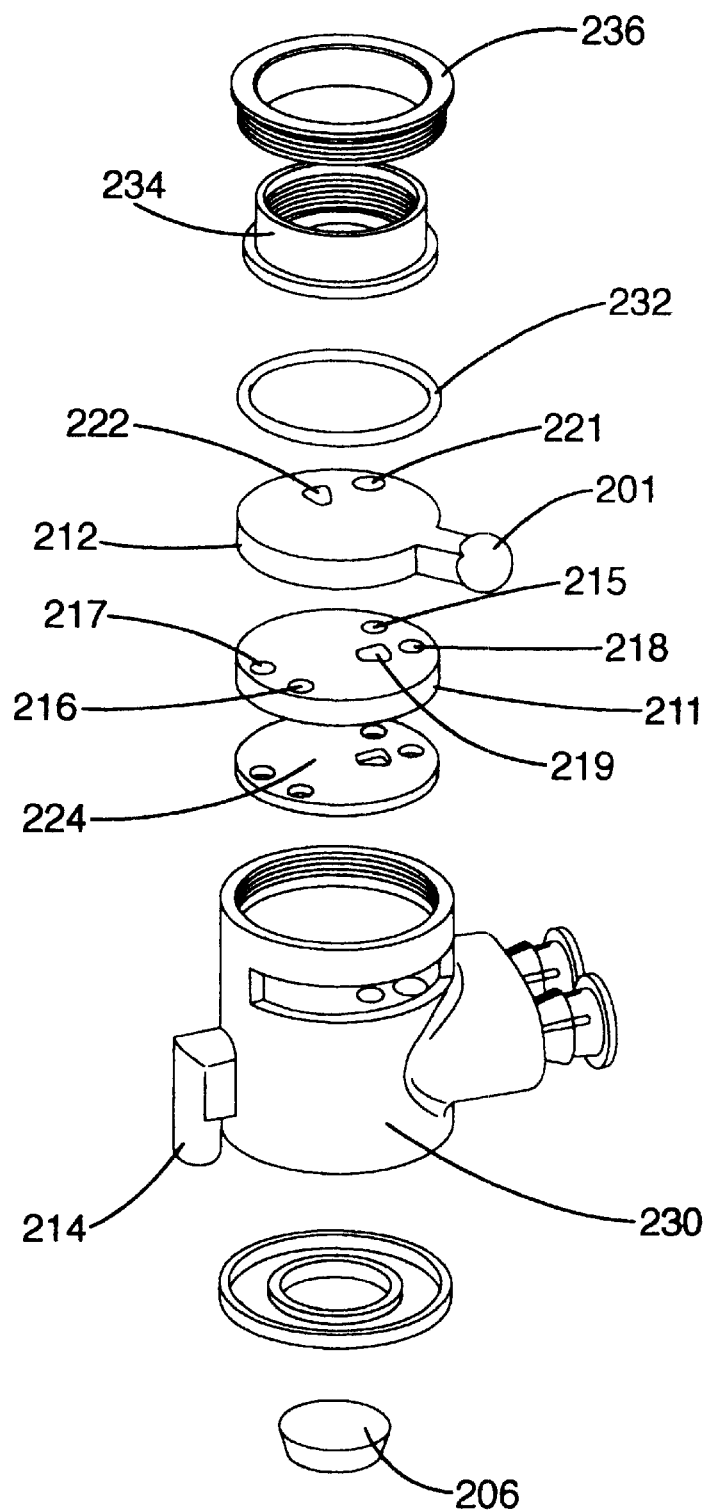
FIG. 16 is front, exploded, perspective view of an alternative ceramic disc diverter valve.
Figure 17:
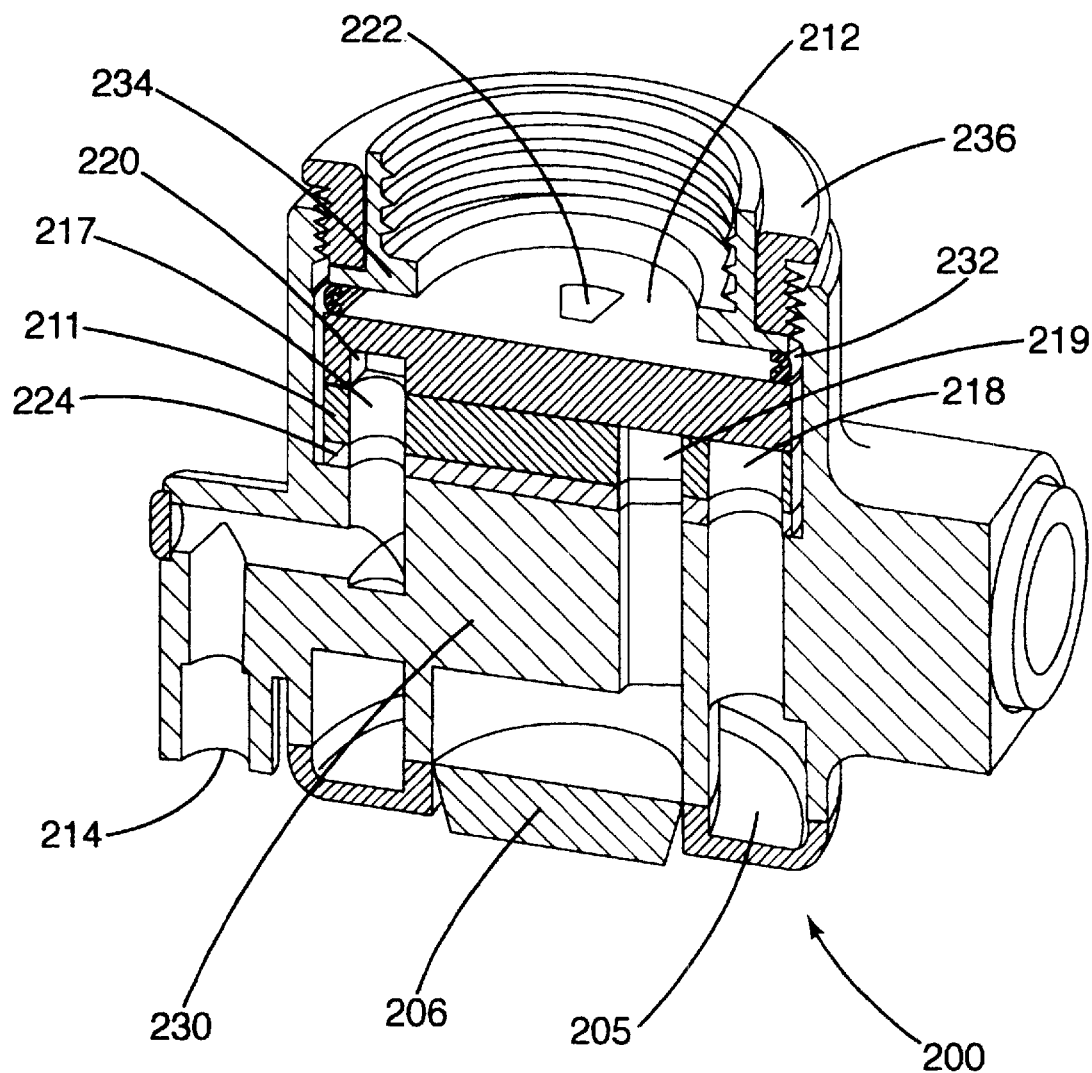
FIG. 17 is a sectional view showing output modes of the alternative ceramic disc diverter valve.

FIG. 16 shows an alternative embodiment of the present invention. Like the above described embodiment, the alternative diverter 200 is operable between a treated mode, a spray mode and a stream mode and provides double positive shutoff when in the spray mode and the stream mode. Unlike the above described embodiment, the alternative diverter 200 accomplishes the above operations with two ceramic discs, instead of three. The diverter 200 also eliminates the bottom disc clamping mechanism of the above described embodiment, such as the screw 116.

The diverter 200 generally includes a housing 230, a rubber gasket 224, a stationary bottom ceramic disc 211, a movable top ceramic disk 212, an O-ring 232, a faucet adapter 234, and a compression ring 236. The rubber gasket 224 is set in the housing 230 and the stationary bottom ceramic disc 211 rests on top of the rubber gasket 224. The stationary disc 211 preferably defines keyways (not shown) that interfit with corresponding keys (not shown) in the housing 230 to prevent rotation of the stationary disc 211 with respect to the housing 230. The movable ceramic disc 212 is on top of the stationary bottom ceramic disk 211. The O-ring 232 fits between the movable ceramic disc 212 and the faucet adapter 234. The O-ring 232 is compressed between the movable ceramic disc 212 and the faucet adapter 234 by the compression ring 236.

The diverter 200 is operated by a handle 201 on the movable ceramic disc 212, although other embodiments may be easily used, such as providing a casing that includes a handle (not illustrated) to move the movable ceramic disc 212. The movable ceramic disc 212 rotates independently of the housing 230, thereby eliminating the need for housing seals and the possibility of the housing leaking as the housing seals become worn.

The stationary ceramic disc 211 defines five holes 215, 216, 217, 218, and 219 and is stationary with respect to the housing 230. The movable ceramic disc 212 defines two holes 221 and 222 and a channel groove 220, with the channel groove 220 opening towards the stationary disc 211. The movable ceramic disc 212 is selectively movable to align the various disc holes and the channel groove as required to deliver the desired type of flow. The size, shape and precise layout of the holes and the channel groove in the stationary and movable discs can vary from application to application as desired.

Figure 18:
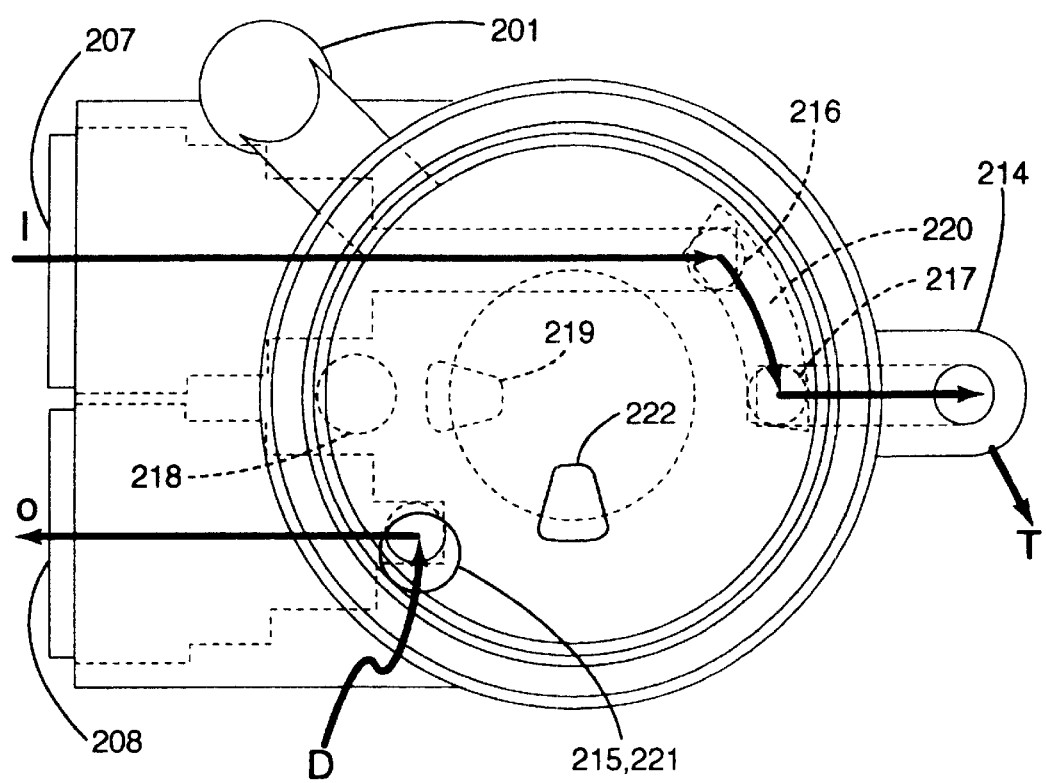
FIG. 18 is a top view showing internal components and flow paths of the alternative ceramic disc diverter valve in treated water mode.

The diverter 200 is shown in FIG. 18 in treated water mode, with the first hole 215 on the stationary ceramic disc 211 and first hole 221 on the movable ceramic disc 212 lined up to allow water flow. The untreated water flows into the diverter 200 from the faucet, and through holes 215 and 221, as shown by arrow D. The untreated water then flows out of the diverter 200 through the secondary outlet 208, as illustrated by arrow O. The water flows from the secondary outlet 208 to a water treatment device (not shown) via a conventional supply line (not shown) connected to the secondary outlet 208. After being treated, the water flows back into the diverter 200 via a conventional supply line (not shown) connected to the secondary inlet 207. The treated water flows into the diverter 200 through the secondary inlet 207, as illustrated by arrow I. The water then flows through the housing 230, through the second hole 216 on the stationary ceramic disc 211, through the channel 220 on the movable ceramic disc 212, through the third hole 217 on the stationary ceramic disc 211 and out the treated water outlet 214, as illustrated by arrow T.

Figure 19:
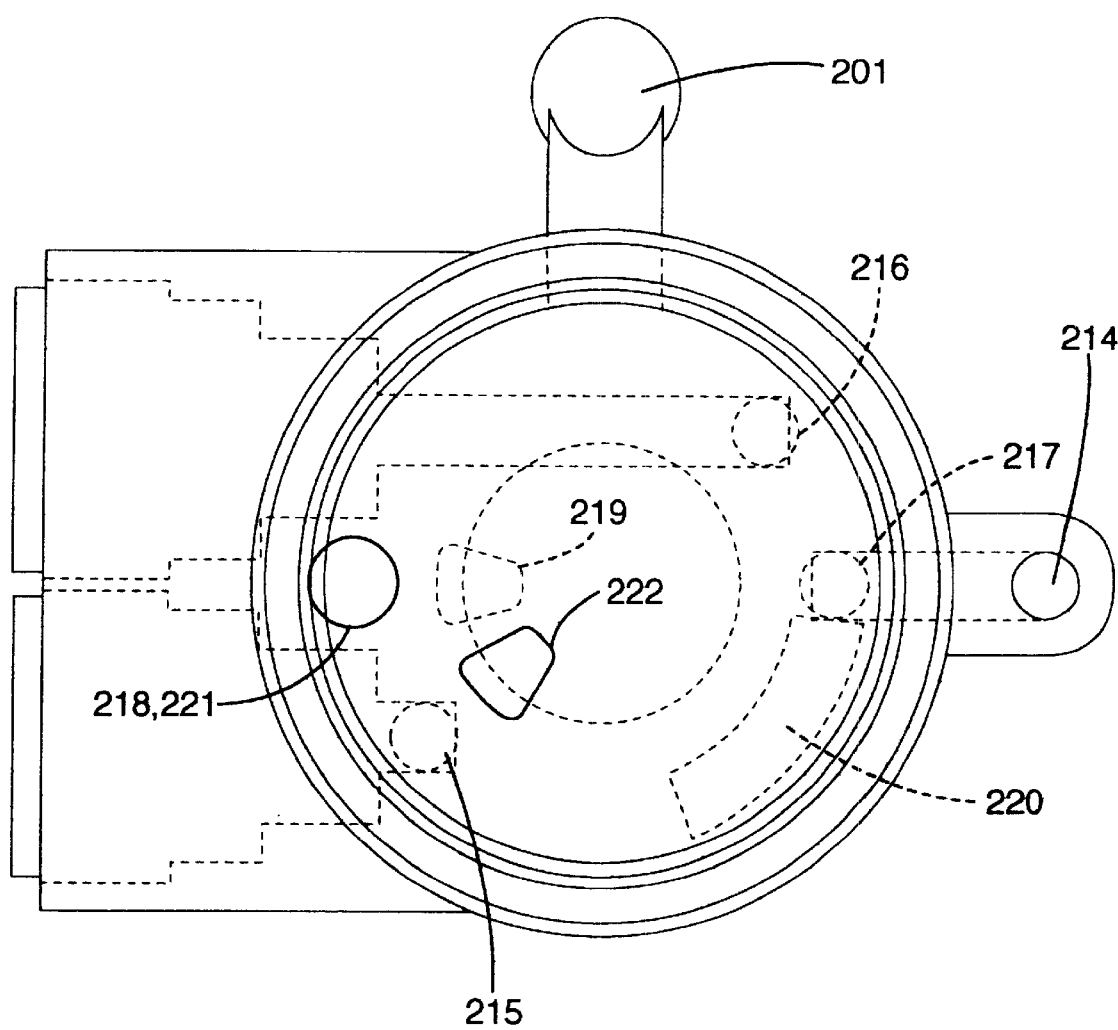
FIG. 19 is a top view showing internal components of the alternative ceramic disc diverter valve in spray mode.

The diverter 200 is shown in FIG. 19 in spray mode, with the fourth hole 218 on the stationary ceramic disc 211 and the first hole 221 on the movable ceramic disc 212 lined up. The untreated water flows into the diverter 200, through the first hole 221 and through the fourth hole 218. The water then passes through the housing 230 and out the spray outlet 205.

Figure 20:
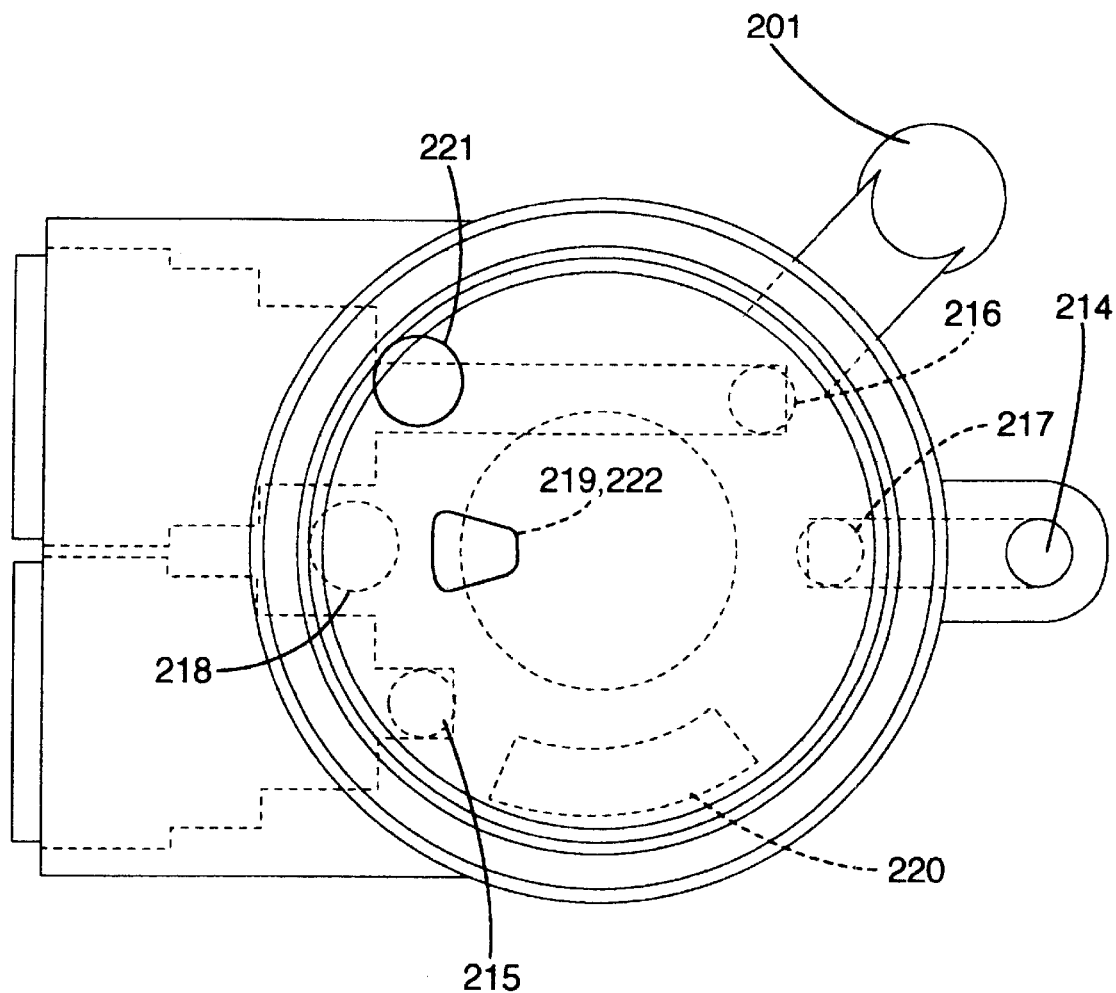
FIG. 20 is a top view showing internal components of the alternative ceramic disc diverter valve in stream mode.

The diverter 200 is shown in FIG. 20 in stream mode, with the fifth hole 219 on the stationary ceramic disc 211 and the second hole 222 on the movable ceramic disc 212 lined up. The untreated water flows into the diverter 200, through the second hole 22 and through the fifth hole 218. The water then passes through the housing 230 and out the stream outlet 206.

The above description is that of a preferred embodiment of the invention. Various alterations and changes can be made without departing from the sprit and broader aspects of the invention as defined in the appended claims, which are to be interpreted in accordance with the principles of patent law, including the Doctrine of Equivalents. Any reference to claim elements in the singular, for example, using the articles "a," "an," "the" or "said," is not to be construed as limiting the element to the singular.

The embodiments of the invention in which an exclusive property or privilege is claimed are defined as follows:

1. A ceramic disc diverter valve comprising:
   a body including an inlet, a first outlet and a second outlet, said body further including a secondary inlet and a secondary outlet;
   means for securing said body to a water faucet with said inlet in fluid communication with the water faucet;
   a ceramic disc stationary within said body;
   a ceramic disc movably disposed within said body in engagement with said stationary disc; and
   means for selectively moving said movable disc into one of a first position wherein said inlet is in communication with said secondary outlet and said secondary inlet is in communication with said first outlet and a second position wherein said inlet is in communication with said second outlet, said movable disc positively sealing said secondary outlet and said secondary inlet when in said second position.

2. The ceramic disc diverter valve of claim 1 wherein said body further includes a third outlet, said means for moving further including means for moving said movable disc into a third position wherein said inlet is in communication with said third outlet, said movable disc positively sealing said secondary outlet and said secondary inlet when in said third mode; and wherein one of said second outlet and said third outlet is a stream outlet and the other of said first or second outlets is a spray outlet.

3. The ceramic disc diverter valve of claim 2 wherein said means for moving said movable ceramic disc includes a handle extending from said movable ceramic disc.

4. The ceramic disc diverter valve of claim 3 wherein said handle is integral with said movable ceramic disc.

5. The ceramic disc diverter valve of claim 4 further including a gasket disposed between said stationary disc and said body; and clamping means for clamping said stationary disc and said gasket to said body independent of said movable disc.

6. The ceramic disc diverter valve of claim 5 wherein said clamping means includes a screw extending through said stationary disc and said gasket into said body.

7. The ceramic disc diverter valve of claim 6 wherein said handle protrudes from said body; and further comprising a selector ring mounted about said body, said selector ring operatively connected to said handle.

8. The ceramic disc diverter valve of claim 7 further comprising a second stationary ceramic disc within said body, said first and second stationary discs disposed on opposite sides of said movable disc.

9. The ceramic disc diverter valve of claim 8 further comprising a head nut securing said movable disc and said second stationary disc within said body.

10. The ceramic disc diverter valve of claim 1 wherein said stationary disc defines a spray hole, a stream hole and a supply hole; and wherein said movable disc defines a supply hole, said movable disc supply hole being aligned with said stationary disc supply hole when said diverter is in said first position, said movable disc supply hole being aligned with said stream hole when said diverter is in said second position, said movable disc supply hole being aligned with said spray hole when said diverter is in a third position.

11. The ceramic disc diverter valve of claim 10 wherein said stationary disc defines a return hole and a treated outlet hole; and wherein said movable disc defines a groove, said groove interconnecting said return hole and said outlet hole when said movable disc is in said first position.

12. A ceramic disc diverter valve comprising:

a diverter valve body having an inlet mountable to a water faucet;

stream outlet means on said diverter valve body for discharging untreated water in a stream;

spray outlet means on said diverter valve body for discharging untreated water in a spray;

treated water outlet means on said diverter valve body for discharging treated water;

secondary outlet means on said diverter valve body for directing water to a water treatment device;

secondary inlet means on said diverter valve body for receiving treated water from the water treatment device;

a first stationary ceramic disc disposed within said diverter valve body;

a movable ceramic disc movably mounted within said diverter valve body adjacent said first disc; and means for moving said movable ceramic disc into one of:
a first position wherein said inlet is in communication with said secondary outlet and said secondary inlet is in communication with said treated outlet;
a second position wherein said inlet is in communication with said stream outlet means and said movable disc seals said secondary inlet and said secondary outlet; and
a third position wherein said inlet is in communication with said spray outlet means and said movable disc seals said secondary inlet and said secondary outlet.

13. The ceramic disc diverter valve of claim 12 further comprising a gasket disposed between said first stationary disc and said body; and clamping means for clamping said first stationary disc and said gasket against said body independently of said second stationary disc and said movable disc.

14. The ceramic disc diverter valve of claim 13 wherein said clamping means includes a screw extending through said first stationary disc and said gasket into said body.

15. The ceramic disc diverter valve of claim 14 wherein said means for moving said movable ceramic disc includes a handle extending from said movable ceramic disc.

16. The ceramic disc diverter valve of claim 15 wherein said handle is integral with said movable ceramic disc.

17. The ceramic disc diverter valve of claim 16 wherein said handle protrudes from said body; and further comprising a selector ring mounted about said body, said selector ring operatively connected to said handle.

18. The ceramic disc diverter valve of claim 17 further comprising a second stationary disc mounted adjacent said movable disc, said movable disc disposed between said first stationary disc and said second stationary disc; and a head nut securing said movable disc and said second stationary disc within said body.

19. The ceramic disc diverter valve of claim 18 wherein said first stationary disc defines a spray hole, a stream hole and a supply hole; and wherein said movable disc defines a supply hole, said movable disc supply hole being aligned with said first stationary disc supply hole when said diverter is in said first position, said movable disc supply hole being aligned with said stream hole when said diverter is in said second position, said movable disc supply hole being aligned with said spray hole when said diverter is in said third position.

20. The ceramic disc diverter valve of claim 19 wherein said first stationary disc defines a return hole and a treated outlet hole; and wherein said movable disc includes a groove, said groove interconnecting said return hole and said outlet hole when said movable disc is in said first position.

21. A ceramic disc diverter valve comprising:

a body having
an inlet mountable to a water faucet;

stream outlet means for discharging untreated water in a stream;

spray outlet means for discharging untreated water in a spray;

treated water outlet means for discharging treated water;

secondary outlet means for directing water to a water treatment device;

secondary inlet means for directing treated water from the water treatment device;

first and second stationary ceramic discs disposed within said diverter valve body; and a movable ceramic disc movably mounted within said diverter valve body between said first disc and said second disc wherein said movable ceramic disc includes an integral handle for selectively moving said movable ceramic disc into one of:

a first position wherein said inlet is in communication with said secondary outlet and said secondary inlet is in communication with said treated outlet;

a second position wherein said inlet is in communication with said stream outlet means and said movable disc seals said secondary inlet and said secondary outlet; and a third position wherein said inlet is in communication with said spray outlet means and said movable disc seals said secondary inlet and said secondary outlet.

22. The ceramic disc diverter valve of claim 21 further comprising a gasket disposed between said first stationary disc and said body; and clamping means for clamping said first stationary disc and said gasket to said body independent of said second stationary disc and said movable disc.

23. The ceramic disc diverter valve of claim 22 wherein said clamping means includes a screw extending through said first stationary disc and said gasket into said body.

24. The ceramic disc diverter valve of claim 23 wherein said handle protrudes from said body; and further comprising a selector ring mounted about said body, said selector ring operatively connected to said handle.

25. The ceramic disc diverter valve of claim 24 further comprising a head nut securing said movable disc and said second stationary disc within said body.

26. The ceramic disc diverter valve of claim 25 wherein said first stationary ceramic disc defines a spray hole, a stream hole and a supply hole; and wherein said movable disc defines a supply hole, said movable disc supply hole being aligned with said stationary disc supply hole when said diverter is in said first position, said movable disc supply hole being aligned with said stream hole when said diverter is in said second position, and said movable disc supply hole being aligned with said spray hole when said diverter is in said third position.

27. The ceramic disc diverter valve of claim 26 wherein said first stationary ceramic disc defines a return hole and a treated outlet hole; and wherein said movable disc includes a groove, said groove interconnecting said return hole and said outlet hole when said movable disc is in said first position.

* * * * *